United States Patent [19]
Leonard, Jr.

[11] 3,923,596
[45] Dec. 2, 1975

[54] FUEL ASSEMBLIES FOR NUCLEAR REACTORS

[76] Inventor: Byron H. Leonard, Jr., 62 Linda Vista, Atherton, Calif. 94025

[22] Filed: Jan. 11, 1960

[21] Appl. No.: 1,676

[52] U.S. Cl. ...................... 176/75; 176/73; 176/76; 176/77
[51] Int. Cl. .............................................. G21c 3/36
[58] Field of Search. 204/193.234, 154.234, 153.37, 204/193.37, 193.2 (36), 154.2 (36); 176/73, 75, 76, 77

[56] References Cited
UNITED STATES PATENTS

| | | | |
|---|---|---|---|
| 2,780,596 | 2/1957 | Anderson............................. | 176/58 |
| 2,832,732 | 4/1958 | Wigner................................. | 176/50 |
| 2,914,454 | 11/1959 | Curinsky et al...................... | 176/78 |
| 2,932,745 | 4/1960 | Alberti et al........................ | 250/517 |
| 2,936,273 | 5/1960 | Untermyer......................... | 176/94 X |
| 2,982,712 | 5/1961 | Heckman............................ | 176/94 X |

FOREIGN PATENTS OR APPLICATIONS

| | | | |
|---|---|---|---|
| 790,688 | 2/1958 | United Kingdom.................. | 176/58 |
| 1,177,820 | 4/1959 | France............................. | 204/193.37 |
| 569,617 | 8/1958 | Belgium............................. | 176/517 |

OTHER PUBLICATIONS
"The Sylvania Technologist", Vol. IX, No. 1, Jan. 1956, pp. 2–6.

Glasstone, Principles of Nuclear Reactor Engineering, 1955, pp. 172–174.

Tid-7559 (Part 1), Fuel Elements Conference, Aug. 1959, pp. 9–27.

*Primary Examiner*—Leland A. Sebastian
*Assistant Examiner*—Roger S. Gaither

EXEMPLARY CLAIM

1. A fuel assembly for a nuclear reactor comprising, a plurality of elongated plate-like fuel bearing elements of the same length and width, paired longer than they are wide and assembly spacer members having means defining opposed spaced notches for receiving the side edges of said elongated plate-like fuel bearing elements, and means for securing said plate-like fuel bearing elements to said paired assembly spacer members with the side edges of said plate-like elements engaged in opposite notches in said paired assembly spacer elements so as to secure said fuel bearing elements in side by side spaced relation in a staggered arrangement transversely so as to conform to a diamond shaped profile in which opposite sides are parallel and opposite angles are substantially 60° and substantially 120°.

3 Claims, 14 Drawing Figures

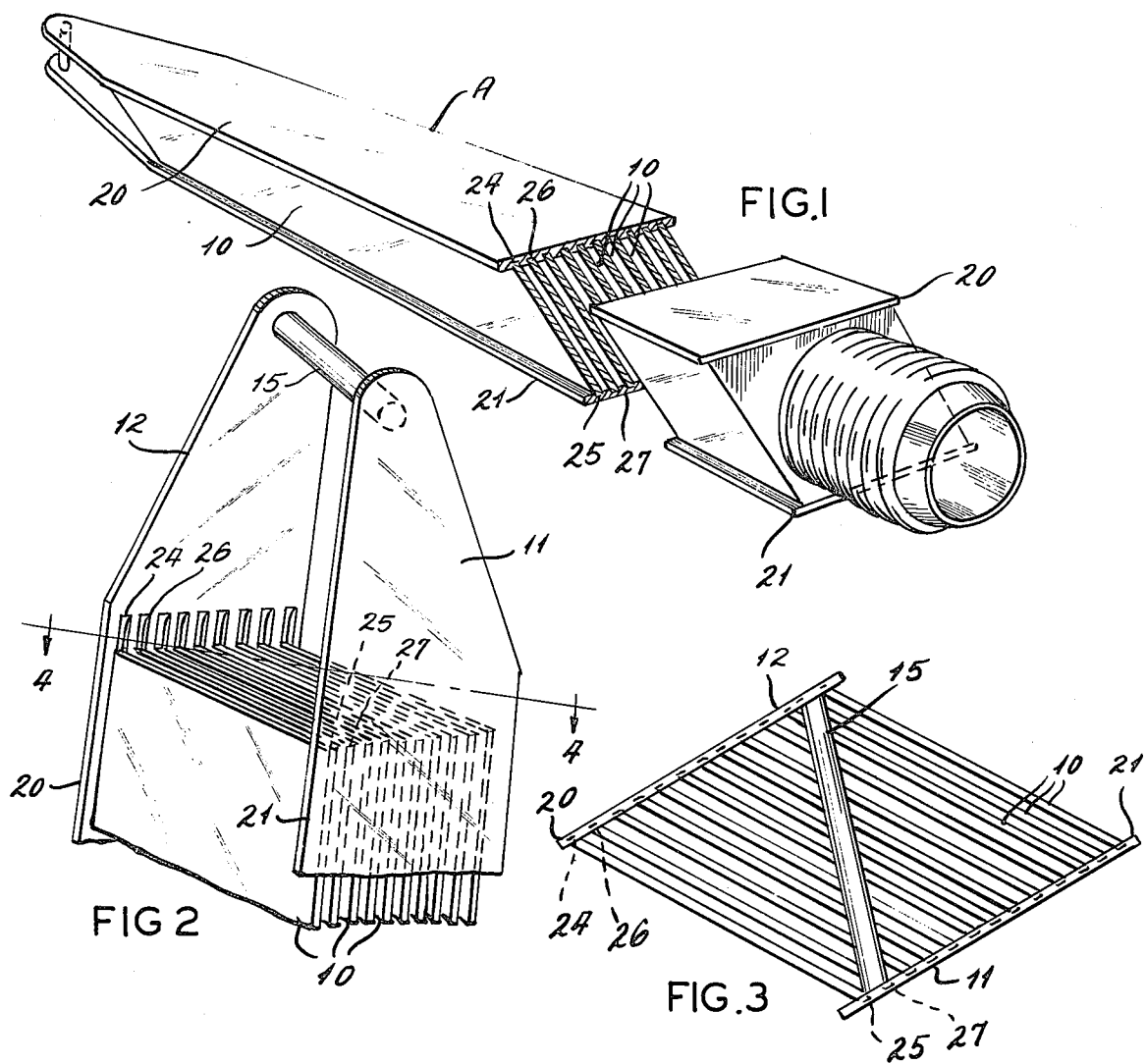
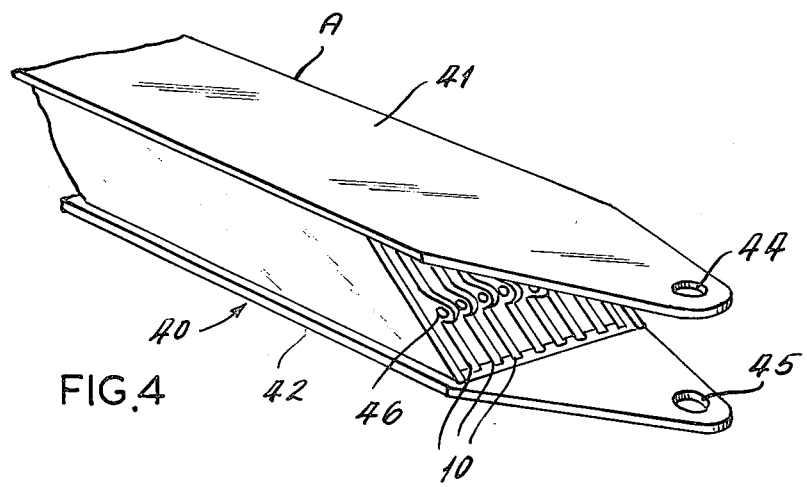

INVENTOR:
BYRON H. LEONARD JR.
BY Sutherland, Poletev Taylor

INVENTOR:
BYRON H. LEONARD JR.
BY Sutherland, Polster + Taylor
ATTORNEYS.

FUEL ASSEMBLIES FOR NUCLEAR REACTORS

This invention relates to nuclear reactors, and more specifically to fuel assemblies for a nuclear reactor, which assemblies are adapted by their shape to be grouped to form a multiplicity of reactor core configurations for the nuclear reactor. As will be readily understood, the requirements for core configuration can change depending upon desired operational characteristics for the nuclear reactor, and it can be readily recognized that adaptability of the shape of a fuel assembly, so as to be grouped with others of the same shape into different core configurations, enhances the utility of the fuel assembly.

Heretofore, a common form of fuel assembly was constructed as a tube of square cross-section, in which the plates or elements bearing the reactor fuel were arranged in a parallel side by side manner. In this form, the fuel bearing plates or elements were all the same shape and size, and fabrication was therefore not difficult. It is one of the objects of this invention to retain the advantages of fuel bearing elements of the same shape and size in a single fuel assembly, but to change the outside geometry of the tube from a square cross-section to a diamond cross-section thereby enhancing utility of the fuel assembly to groupings into novel core configurations, or by a few handling operations from a grouping in one core configuration to other groupings forming distinctly different core configurations. The term diamond, as used here, includes a four sided box with opposite sides equal and substantially parallel, in which the opposite angles between the sides are less than 90° in one instance and more than 90° in the other, preferably two angles are substantially 60° and the other two, 120°.

It is a further object of the invention to provide a fuel assembly in the form of diamond shape for a plurality of fuel elements of known shape, such as plates, tubes, or rods, in every case the fuel elements may be either fixed or detachably mounted one with respect to the other.

According to this invention, a plurality of fuel bearing plates, tubes, or rods, which are of equal size and identical shape are mounted parallel in a staggered arrangement so that their transverse profile is a diamond cross-section. The fuel elements may be mounted in a tube or in a framework, in which the fuel elements form a part. As will be hereinafter pointed out, the outside shape of each fuel assembly being of diamond profile lends itself to groupings to form generally cylindrical cores, which by a few simple handling operations may be changed to substantially square core configurations, or a hollow substantially cylindrical core configuration, or a hollow substantially square core configuration. In other words, the profile shape of the fuel assemblies lend flexibility to core configuration, this feature of the invention being very attractive for original designs and for experimental use in nuclear reactors.

The following is a detailed description of the invention in such full, clear, and exact terms as to enable any persons skilled in the art to make and use the same when taken with the accompanying drawings in which:

FIG. 1 is a perspective view of the bottom portion of a fuel assembly with the plates which bear the fuel in section so as to facilitate an understanding of the mounting;

FIG. 2 is a perspective view of the top end of a fuel element shown in FIG. 1;

FIG. 3 is a schematic top view illustrating the diamond profile of plate mounting in FIG. 1 and FIG. 2;

FIG. 4 is a perspective view of the top portion of another fuel assembly;

Figure 5:
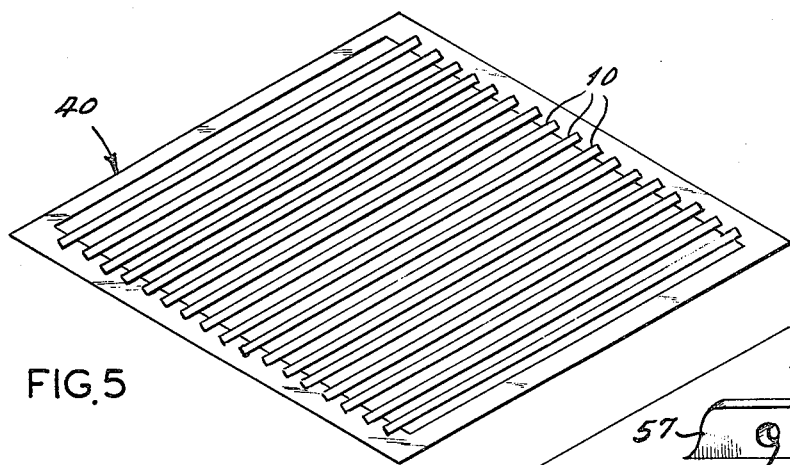
FIG. 5 is a schematic top view showing the diamond profile of the fuel element in FIG. 4.

Turning now to FIG. 1, the fuel assembly A therein illustrated exemplifies one form of construction for the invention, in which, for example, the fuel bearing elements are shown as plates, which are similar size and similar shape. It is contemplated, however, that these plates might be tubular in form or fuel rods. Either the tubes or the rods might be arranged side by side so as to form similar elements to the fuel plate 10 shown in FIG. 1. According to this particular illustration in FIG. 1, each fuel plate 10 is of similar size and shape, and consequently only one will be described. Each plate 10, however, is a fuel bearing element preferably containing enriched uranium.

The inner side of each frame member 20 and 21 is notched to form spaces for the fuel plates 10. Since the notches in both frame members 20 and 21 are identical, only one set will be described. Thus in the member 20, the inside face thereof is formed with a plurality of rectilinear notches, such as 24, 26, etc. It will be understood that the frame member 21 has similar notches, such as 25, 27, etc., each of the fuel elements or plates 10 are mounted in the spacer members 20 and 21 with their edges in the notches 24, 26, etc. in the member 20, and the notches 25 and 27, etc. in the spacer member 21 engaging the opposite edges of the fuel elements or plates 10. The plates or fuel elements 10 may in turn be riveted, or welded, or secured by peening to the spacer members 20 and 21, which are plural spacer elements separating the fuel plates. Plural spacer elements, such as 20 and 21, may also be secured only at intervals along the length of the edges of the fuel plates 10 and at the bottom thereof. When suitably secured to the fuel plates, the plural spacers and plate elements form a fuel assembly. As shown in FIG. 2, spacers 20 and 21 have ears 11 and 12 connected by rod 15 for receiving a manipulating tool for moving the fuel assembly in and out of the core.

As shown in FIG. 3, the fuel assembly, when so constructed with the plates in parallel rows and in staggered relation as positioned by plural spacer elements 20 and 21, has a diamond shaped profile, and as the description proceeds it will be apparent that this is a common characteristic of each of the fuel assemblies described hereinafter.

FIG. 4 illustrates another form of the invention, in which the fuel assembly has an outer tubular casing, such as 40. Two sides 41 and 42 of the tube 40 are slotted lengthwise to receive the edges of the fuel elements 10, and preferably are identical with the plural spacer elements 20 and 21 above described in FIG. 1. Likewise, each of the fuel elements 10 are suspended in spaced relation by the plural spacer elements, and the plates 10 are retained in place by brasing, welding or peening, or some may be removable. The walls of the tube 40 are apertured at opposite sides at 44 and 45 to permit handling. Likewise, each of the fuel elements 10 may have a suitably apertured top portion 46, so that the individual elements may be withdrawn from the fuel assembly. In this respect, it should be noted that FIG. 4 omits some of the fuel elements 10 for the purpose of clarity, however, as will be seen from FIG. 5, the elements 10 when viewed in top plan have a diamond shape profile and are supported in the tube 40 in parallel, staggered relation.

Figure 6:
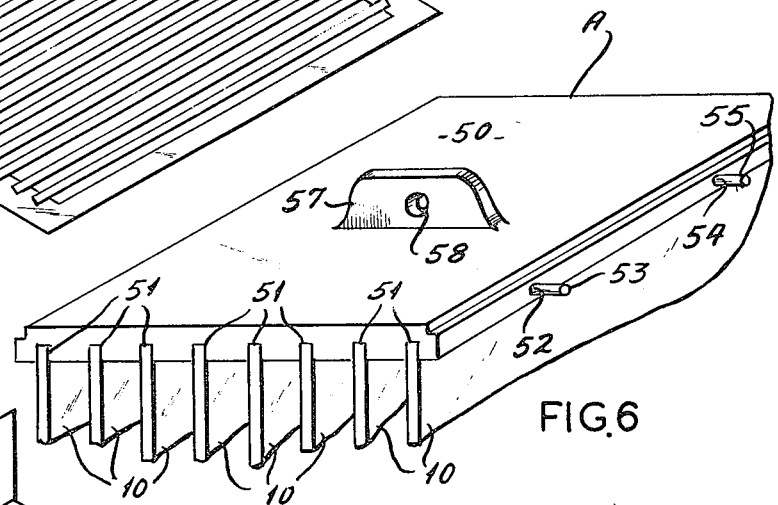
FIG. 6 is a perspective view of the upper portion of another fuel assembly showing the manner of securing the fuel bearing plates together.
Figure 7:
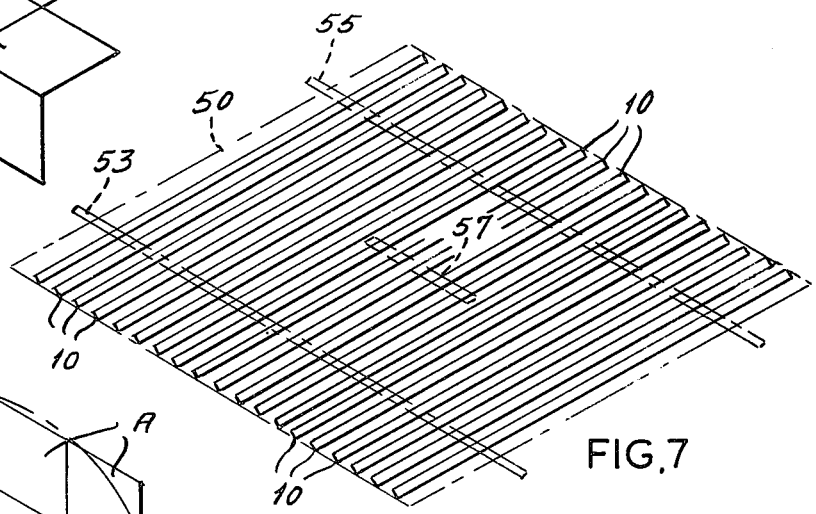
FIG. 7 is a schematic top plan of FIG. 6 illustrating the diamond profile of the fuel assembly with the top spacer element shown in dotted lines.

The modification shown in FIG. 6 differs from the prior modifications in that the plural spacer element, here indicated as 50, is superimposed on the end surfaces of the fuel elements 10. The spacer element 50 has the plural notches similar to those already described in FIG. 1, the notches are collectively indicated as 51. The manner of attaching the fuel elements or plates 10 to the plural spacer element 50 is preferably by a pin connection. The spacer element 50 is bored from end to end forming holes 52 and 54 which receive rods, such as 53, and 55 passing through the notches 51 in the spacer element 50, and through individual holes in each of the fuel elements, so as to securely hold the spacer element attached to the upper ends of the fuel elements 10. Referring to FIG. 7, it will be seen that the spacer element 50 secures the fuel elements 10 in spaced parallel relation and in a staggered arrangement, so that the top view of the fuel elements is a diamond profile. The bottom ends of the fuel plates 10 are secured to a spacer element corresponding to element 50. One or more ears 57 apertured at 58 facilitate the handling of the fuel assembly.

Figure 8:
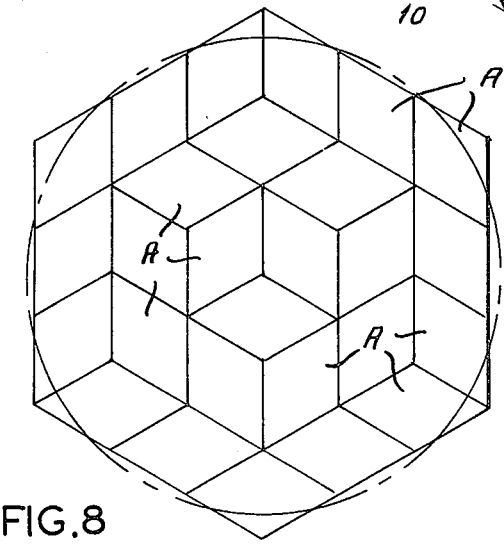
FIG. 8 is a schematic illustration of a core configuration formed of the fuel elements heretofore shown.

FIG. 8 schematically illustrates how the fuel elements, such as heretofore constructed, are grouped so as to simulate a circular or cylindrical core configuration. Actually the core configuration is hexagonal, but this is not necessarily the limit of an approach to a cylinder. In the particular schematic illustration of FIG. 8, the diamond profiles have angles of 60° and 120°, which of course, results in the arrangement that is hexagonal. Other variations in the diamond shape would more closely approximate a cylindrical core.

Figure 9:
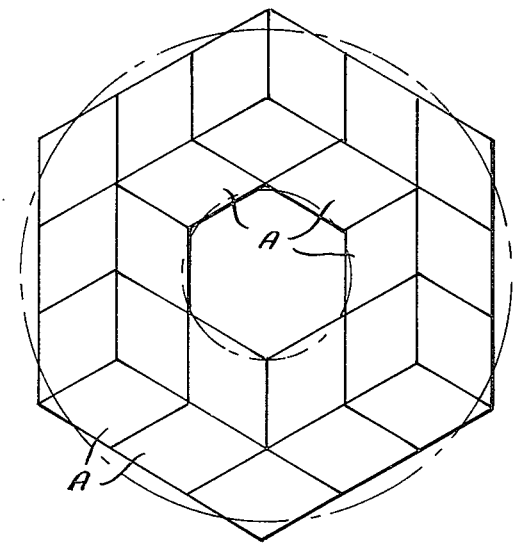
FIG. 9 is another schematic view of a core configuration formed of the fuel elements heretofore illustrated.

In a test or experimental type of reactor, it is possible to withdraw the three central fuel assemblies of FIG. 8 so as to wind up with a core configuration, such as shown in FIG. 9, in which the core has a flux trap centrally located therein.

Figure 10:
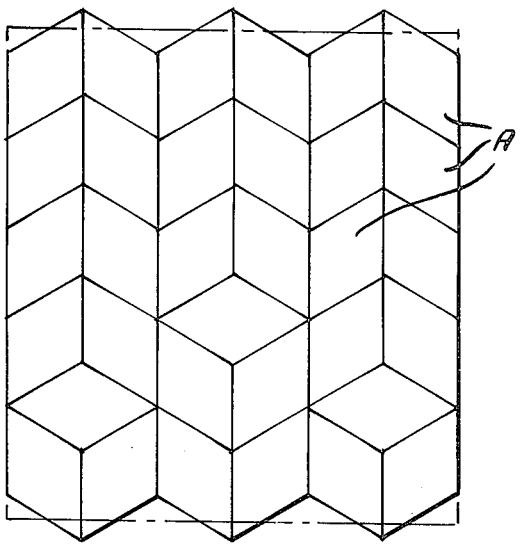
FIG. 10 is a schematic view of another core configuration formed of fuel elements such as heretofore described.

The square configuration of the core shown in FIG. 10 can be arrived at by simple addition of fuel assemblies to the core arrangement of FIG. 9, and the rearrangement of some but not all of the original fuel assemblies. For example, those assemblies illustrated in FIG. 9 in dotted lines are changed in position, and the shaded assemblies are added. The position change required is merely turning the fuel assemblies 90°. This simplifies the change in core configuration during reactor operation.

Figure 11:
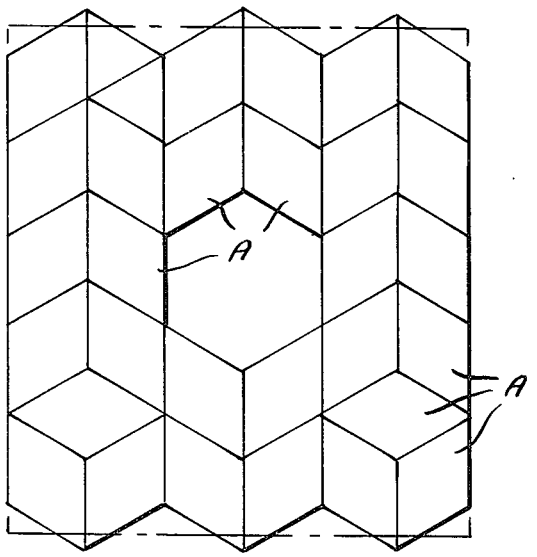
FIG. 11 is a schematic top view of another core configuration formed of the fuel elements heretofore illustrated.

FIG. 11 illustrates a core of generally or substantially square configuration with central element assemblies removed to form a flux trap.

Figure 12:
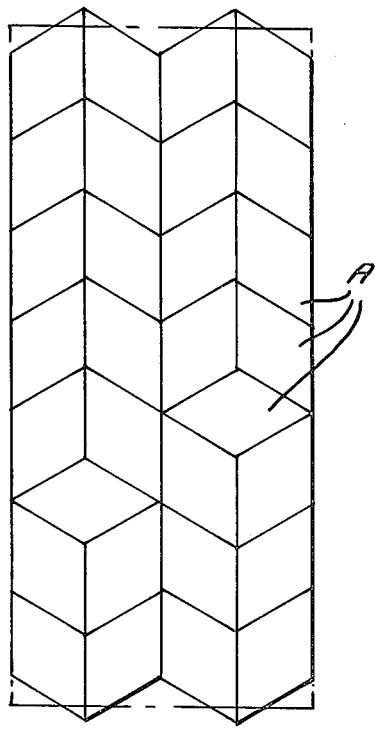
FIG. 12 is a schematic top view of another core configuration formed of the fuel assemblies heretofore illustrated.

FIG. 12 illustrates a slab configuration for the core formed of the same fuel assemblies.

Figure 14:
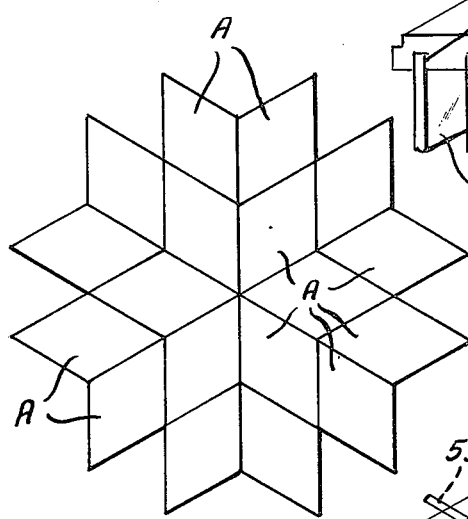
FIG. 14 is a top view of another core configuration formed of the fuel assemblies heretofore illustrated.
Figure 13:
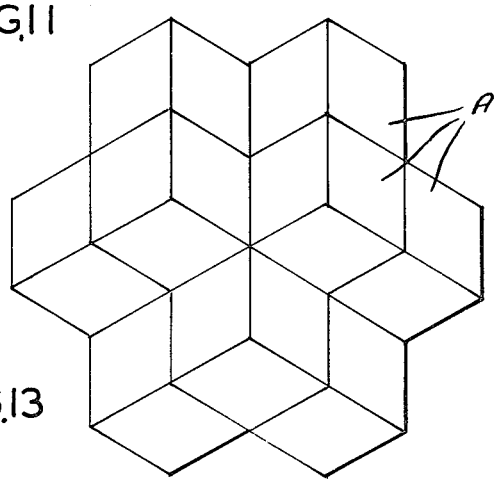
FIG. 13 is a schematic top view of another core configuration formed of the fuel assemblies heretofore illustrated.

FIGS. 13 and 14 illustrate other arrangements, which can be obtained by combining a group of fuel assemblies of diamond profile. These are illustrations tending to show the versatility which the fuel assemblies lend to core configuration, and each can be obtained by simple manipulative steps to change from one to another for experimentation.

A construction has been described for the fuel assemblies which will fulfill all of the objects of the invention, but it is contemplated that other modifications will occur to those skilled in the art which come within the scope of the appended claims.

Having thus described the invention, what is claimed and desired to be secured by Letters Patent is:

1. A fuel assembly for a nuclear reactor comprising, a plurality of elongated plate-like fuel bearing elements, of the same length and width, paired longer than they are wide and assembly spacer members having means defining opposed spaced notches for receiving the side edges of said elongated plate-like fuel bearing elements, and means for securing said plate-like fuel bearing elements to said paired assembly spacer members with the side edges of said plate-like elements engaged in opposite notches in said paired assembly spacer elements so as to secure said fuel bearing elements in side by side spaced relation in a staggered arrangement transversely so as to conform to a diamond shaped profile in which opposite sides are parallel and opposite angles are substantially 60° and substantially 120 degrees.

2. A fuel assembly for a nuclear reactor comprising, a plurality of elongated plate-like fuel bearing elements, a tubular casing for containing said plate-like fuel bearing elements, said casing being of diamond shaped profile in which opposite sides of the tube are parallel and opposite angles are substantially 60° and substantially 120°, and paired assembly spacer members secured at opposite sides of said tubular casing at the top thereof and at the bottom thereof, said assembly members having means forming opposed aligned notches for engaging the opposite sides of said plate-like fuel bearing elements.

3. A fuel assembly for a nuclear reactor comprising, a plurality of rows of elongated rectangular fuel bearing elements of the same length and width and longer than they are wide, assembly spacer members having means on one side thereof forming a plurality of notches for engaging said rows of fuel bearing elements at opposite ends thereof, and means for securing said elements in said assembly spacer members in side by side spaced relation in a staggered arrangement transversely so as to conform to a diamond shaped profile in which opposite sides are parallel and opposite angles are substantially 60° and substantially 120°.

* * * * *